United States Patent Office 3,410,255
Patented Nov. 12, 1968

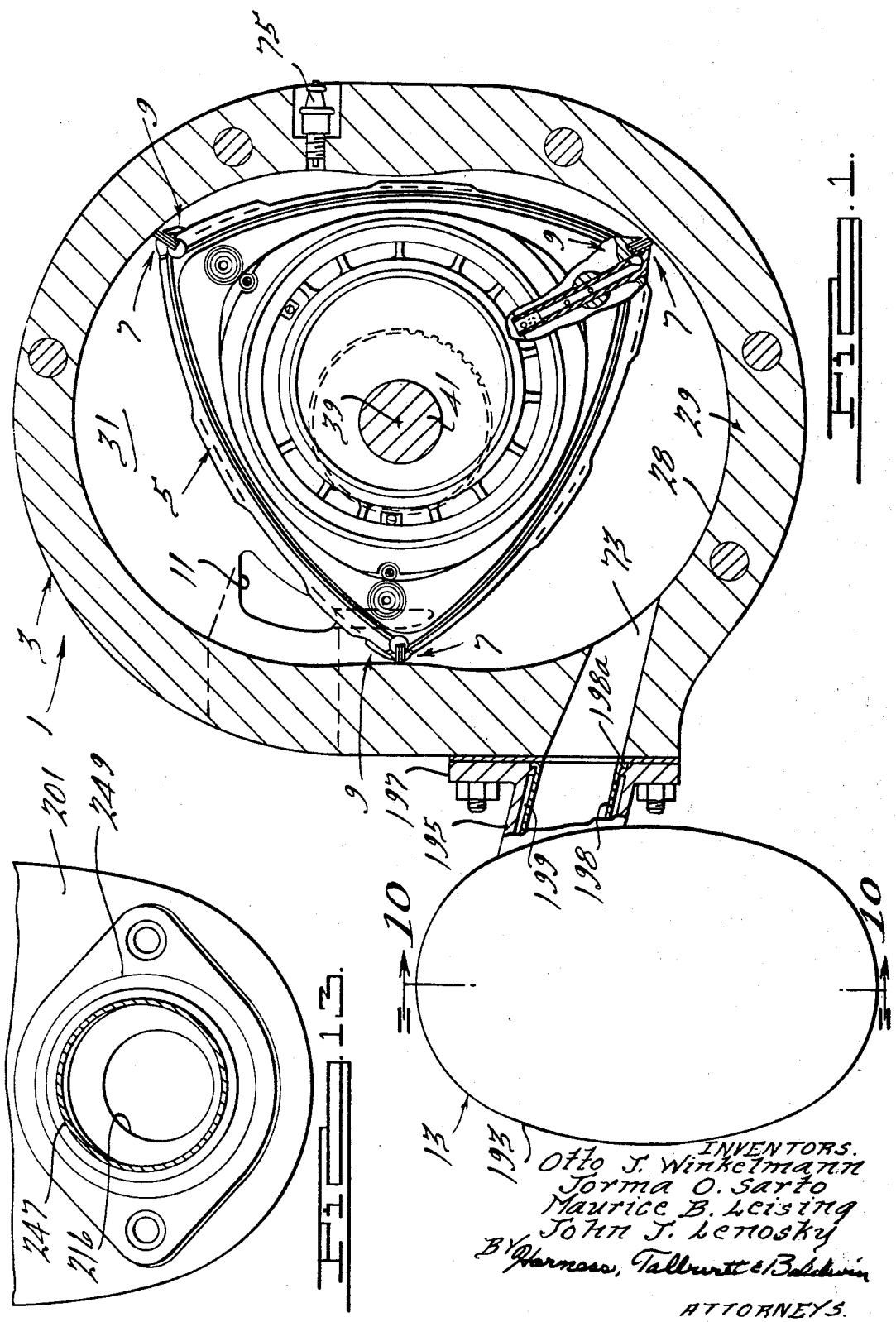

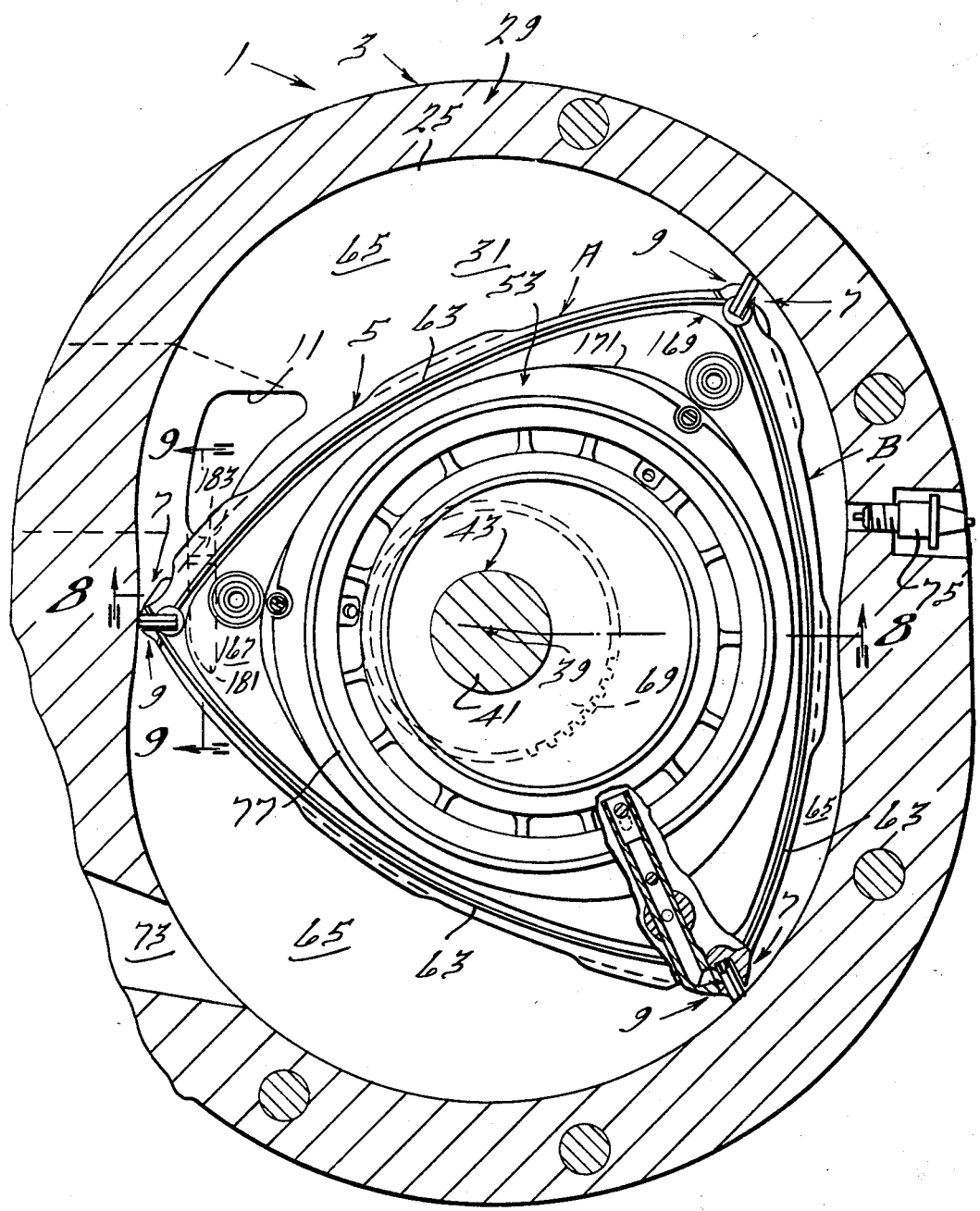

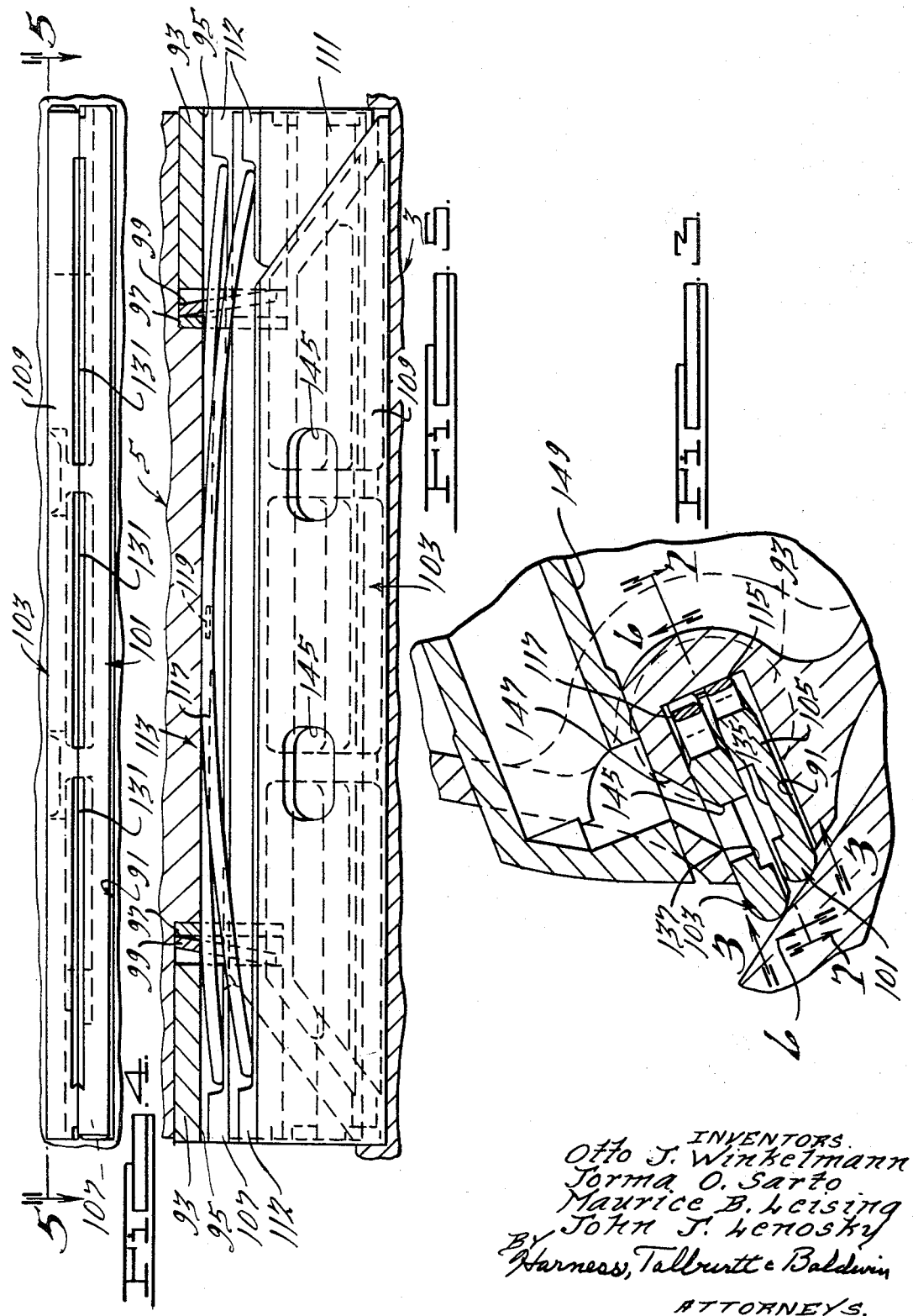

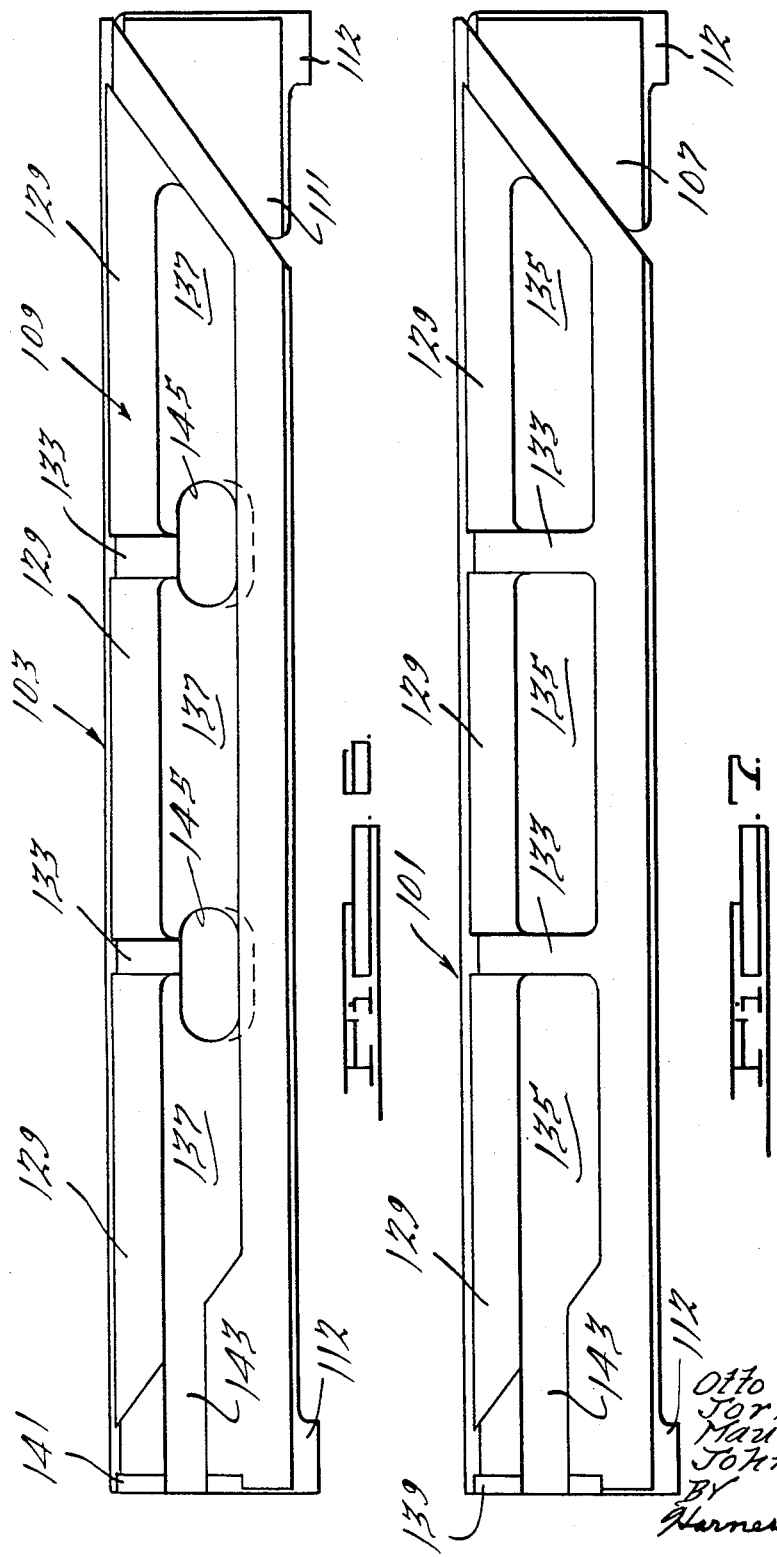

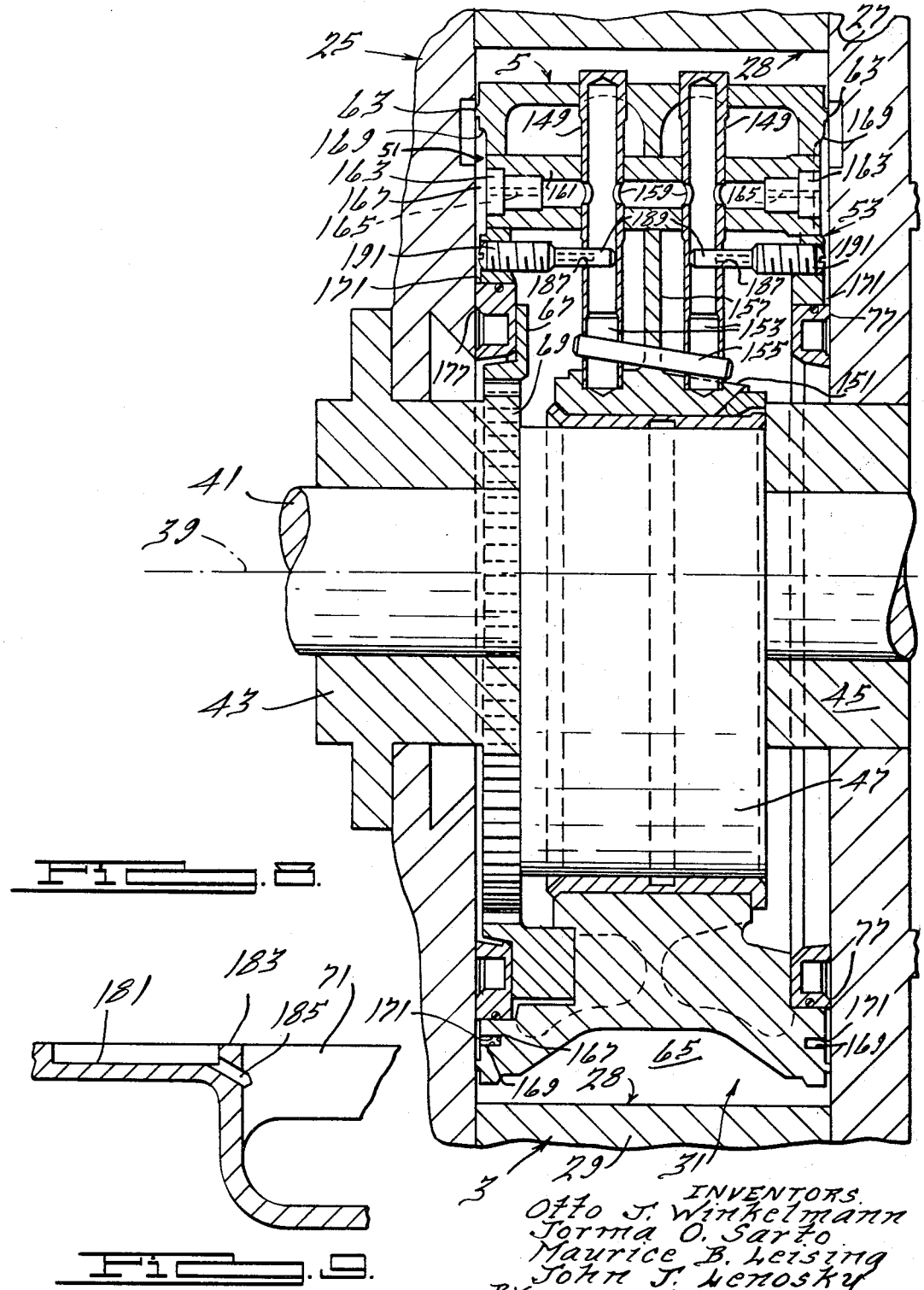

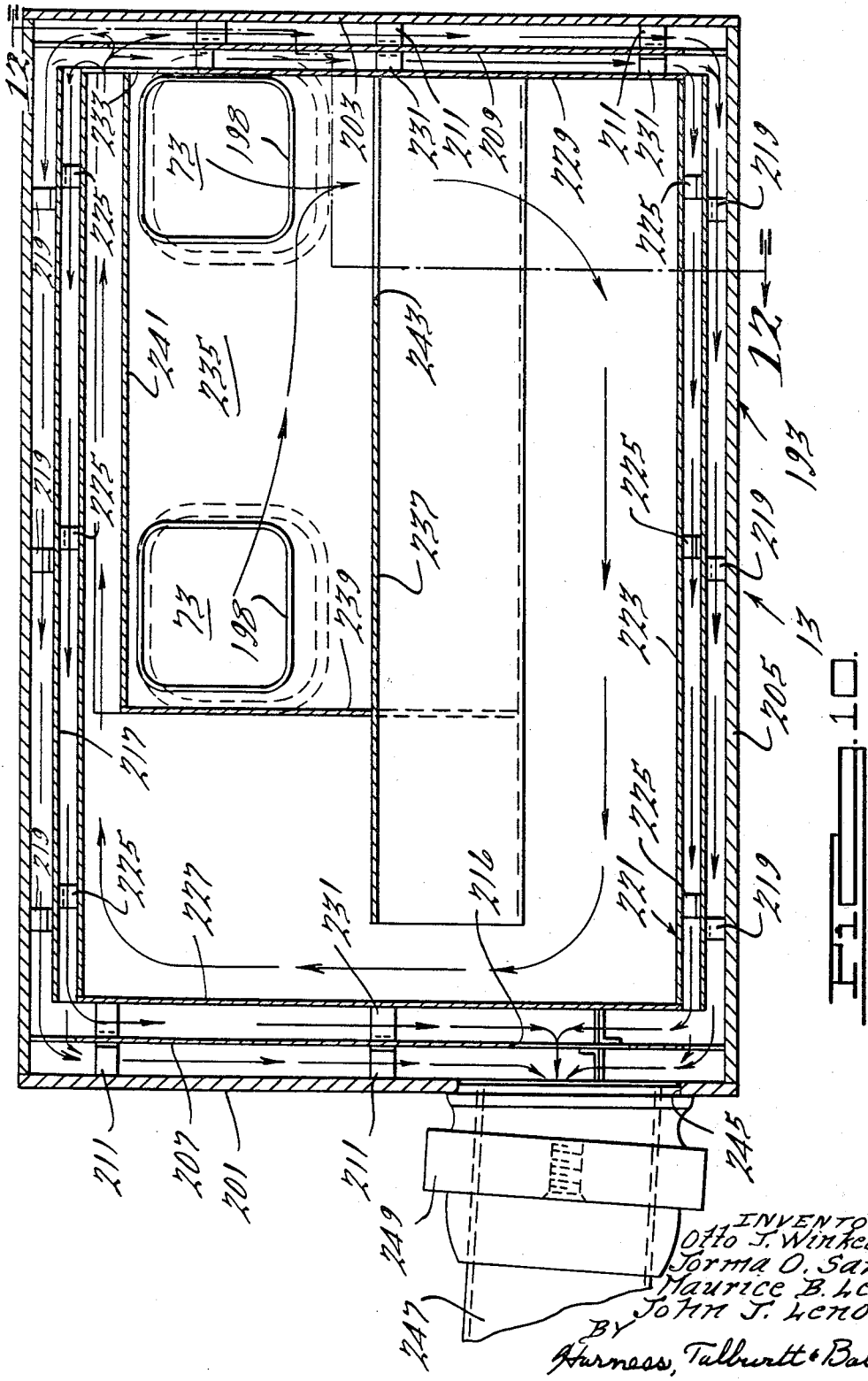

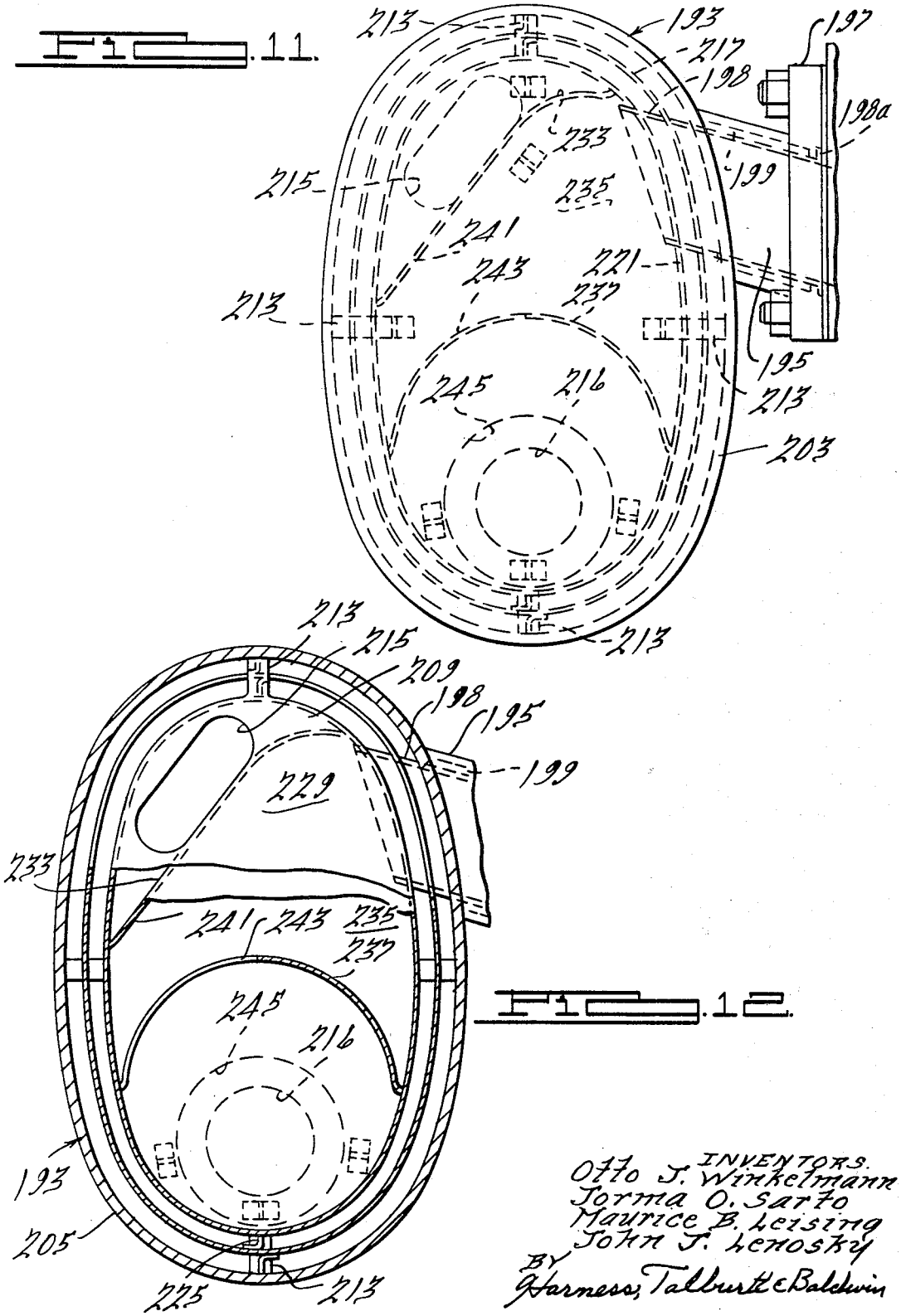

3,410,255
ROTARY MECHANISM
Otto J. Winkelmann, Birmingham, Jorma O. Sarto, Orchard Lake, John J. Lenosky, Detroit, and Maurice B. Leising, Clawson, Mich., assignors to Chrysler Corporation, Highland Park, Mich., a corporation of Delaware
Filed Feb. 16, 1967, Ser. No. 616,601
10 Claims. (Cl. 123—8)

ABSTRACT OF THE DISCLOSURE

Rotary combustion engine having dual seals on each apex of a rotor, the seals being vented through the rotor to the intake ports for returning a portion of the unburned fuel which is tending to be forced past the seals to the intake ports, and an after-burner connected to the exhaust ports for facilitating combustion of unburned fuel discharged from the exhaust ports.

Background of the invention

This invention relates to rotating combustion mechanisms or engines of the type shown in U.S. Patent 2,988,065, and more particularly to means for inhibiting emission of unburned fuel from the engine.

There are several types of rotating combustion engines and the present invention is described in connection with, although it is not limited to, a rotary combustion engine of the type comprising an outer body having an axis, end walls axially spaced from one another, and a peripheral wall interconnecting the end walls. The inner surfaces of the peripheral wall and the end walls form a cavity within which an inner body or rotor is mounted. The inner surface of the peripheral wall is substantially parallel to the axis of the cavity and has a multi-lobed profile which is preferably an epitrochoid. The axis of the rotor is parallel to but spaced from the axis of the outer body cavity and the rotor has end faces disposed adjacent the end walls of the body. The rotor also has a plurality of circumferentially spaced apex portions, the number of apex portions being one more than the number of lobes of the epitrochoid of the inner surface.

The rotor is rotatable relative to the outer body in such a manner that the apex portions continuously engage the inner surface of the peripheral wall to form a plurality of working chambers between the rotor peripheral surface and the inner surface. These chambers vary in volume during engine operation as a result of the relative rotation of the rotor and outer body. Rotary engines of this type include at least one intake port or passage in the outer body for admitting the fuel-air mixture to the chambers, an exhaust port or passage in the outer body for venting the chambers, and suitable ignition means so that during engine operation the working chambers of the engine have a cycle of operation which includes the four phases of intake, compression, expansion and exhaust. As described in the aforementioned U.S. patent, this cycle of operation is achieved as a result of the relative rotation of the inner rotor and outer body. To obtain the relative rotation both the inner rotor and outer body may rotate or one, preferably the inner rotor, may rotate while the outer body remains stationary.

The working chambers of the engine, for efficient operation of the latter, should be sealed against leakage. In this regard, an effective seal should be provided between each rotor apex portion and the inner surface of the peripheral wall of the outer body, as well as between the end faces of the rotor and the end walls of the body.

In prior rotary combustion engines of this type one or more radially-movable seal strips are disposed in a groove in each apex portion of the rotor so that each adjacent pair of working chambers is separated by an apex seal strip or strips. These seals should withstand the severe combustion pressures and temperatures which occur as each working chamber passes through the intake, compression expansion and exhaust phases of engine operation. During operation of the engine, under certain conditions, the apex seals may lift off and out of contact with the inner surface of the peripheral wall, and move radially inward relative to the peripheral wall. This may be due to several factors, such as for example, minute cavities or minute humps in the surface of the peripheral wall which cause spaces to be formed between the wall and the seals. The apex seals also tend to tilt from the desired radial disposition, so that contact between a seal and the wall of the slot in which the seal is located is reduced from surface contact to a line contact. This tilting is due to the pressure differential between the gases in adjacent chambers. Any apex seal movement results in a loss of sealing action, and in the case of a rotary combustion engine, causes leakage of gases, which are particularly disadvantageous between a working chamber in its compression phase and the adjacent working chamber in its expansion and exhausting phase. As a result of this apex seal movement, the effectiveness of the seal is substantially reduced and gas leakage occurs between the working chambers so that some of the fuel-air mixture is not ignited and escapes past the seal between combustion and expansion chambers. This unburned fuel then passes directly out of the engine through the exhaust system into the atmosphere. Moreover, it has been found that combustion of the fuel-air mixture in the combustion chamber is not complete so that additional unburned fuel is swept out of the engine through the exhaust port as the chamber containing the remaining unburned fuel reaches the exhaust port.

The emission of unburned fuel from rotary combustion engines has presented a substantial obstacle to further development and utilization of the engines. As is well known, control and prevention of emission of unburned fuel, particularly, in combustion engines, is of paramount importance in today's society. Prior attempts at reducing the unburned fuel emission from rotary combustion engines have met with some success, but further reductions in the emission of unburned fuel are desirable.

Summary of the invention

Briefly, the apparatus of this invention comprises a rotary mechanism having the combination of (a) apex portion sealing means adapted to permit a portion of the unburned fuel and air mixture, which is tending to escape past the sealing means, to flow through passage forming means in the rotor back toward the fuel intake of the engine, and (b) means for permitting unburned fuel which has escaped past the sealing means to burn after the fuel has been discharged from the exhaust port or ports of the engine, thus inhibiting emission of the unburned fuel into the atmosphere.

Accordingly, one of the primary objects of this invention is to provide a rotary combustion engine having improved control of unburned fuel emission, i.e., a rotary combustion engine in which the emission of unburned fuel therefrom is decreased over prior constructions.

A further object of this invention is to provide a rotary combustion engine of the type described wherein portions of the unburned fuel tending to escape past the apex seals of the engine are returned to the fuel intake port of the engine, and other portions of unburned fuel tending to escape past the apex seals are burned prior to the exhaust thereof into the atmosphere.

A further object of this invention is to provide a rotary combustion engine having unburned fuel emission control apparatus which is economical in construction and efficient in operation.

Other objects and advantages of this invention will become apparent as the description progresses.

*Description of the drawings*

In the accompanying drawings, in which one of various possible embodiments is illustrated, FIG. 1 is a schematic and elevational view of a rotary combustion engine embodying this invention, the size of certain parts being exaggerated and other parts being shown in section for clarity;

FIG. 2 is an enlarged fragmentary view of FIG. 1;

FIG. 3 is an enlarged fragmentary view of FIG. 2;

FIG. 4 is a section taken along line 3—3 of FIG. 3; certain parts being removed for clarity;

FIG. 5 is a section taken along line 5—5 of FIG. 4;

FIGS. 6 and 7 are sections taken along lines 6—6 and 7—7, respectively of FIG. 3, certain parts being removed for clarity;

FIG. 8 is an enlarged section taken along line 8—8 of FIG. 2;

FIG. 9 is an enlarged section taken along line 9—9 of FIG. 2;

FIG. 10 is an enlarged section taken along line 10—10 of FIG. 1;

FIG. 11 is an enlarged fragmentary end elevation of FIG. 1;

FIG. 12 is a section taken along line 12—12 of FIG. 10; and

FIG. 13 is a fragmentary end view of FIG. 10 taken from the left hand end of FIG. 10.

Like parts are indicated by corresponding reference characters throughout the several views of the drawings.

*Description of the preferred embodiment*

Referring now to the drawings, a rotary mechanism of this invention in the form of an internal combustion engine is generally indicated at 1. Basically, it comprises an outer body 3, an inner body or rotor 5 having seal and vent means 7 for sealing apex portions 9 against the inner surface of body 5 and venting unburned fuel to an intake port 11, and a reactor or after-burner 13 for burning unburned fuel which is forced past the apex seal and vent means 7.

More specifically, outer body 3 has axially spaced end walls 25 and 27 (see FIG. 8) and a peripheral wall 29 disposed therebetween to form a cavity 31. Only one cavity 31 is shown in the body 3 illustrated herein, but it will be understood that the engine may be constructed with a plurality of cavities therein located side-by-side, if desired. In fact, the reactor 13 shown herein is designed for attachment to a body 3 having two cavities 31 located side-by-side. When the engine is viewed in a plane extending transversely to the axis 39 of the cavity 31, the inner surface 28 of the peripheral wall 29 of the cavity has a multi-lobed profile which preferably is basically an epitrochoid, and preferably has two lobes.

A shaft 41, coaxial with the axis 39, extends through the outer body and is journaled in bearings 43 and 45 carried by the end walls 25 and 27, respectively. The shaft 41 has an eccentric portion 47 on which the inner body or rotor 5 is journaled. The inner body 5 has axially spaced side or end faces generally indicated at 51 and 53 disposed adjacent the outer body end walls 25 and 27, respectively. As mentioned previously, the inner body 5 also has a plurality of circumferentially-spaced apex portions 9 which, as set forth in the aforementioned patent, are one more in number than the number of lobes in the cavity 31. The apex seal and vent means generally indicated at 7 and described in detail hereafter, are in sealing engagement with the peripheral wall inner surface 28. The end faces 51 and 53 have end seal means 63 disposed in sealing engagement with the end walls 25 and 27 to form a plurality of working chambers 65 which vary in volume upon rotation of the rotor 5 relative to the outer body 3. The geometrical axis of the rotor is offset from and disposed parallel to the axis 39 of the outer body.

In the engine illustrated, it is to be assumed that the outer body 3 is stationary while the inner body 5 rotates within the outer body. In order to maintain the motion of the rotor 5 relative to the stationary outer body 3 an internal gear 67 (see FIG. 8) is secured to the inner rotor 5 and is disposed in meshing engagement with a gear 69 fixed to the bearing 43 which is secured to the end wall 25 of outer body 3. The fixed gear 69 is coaxial with shaft 41.

As described previously, the outer body has intake port means 11 in end walls 25 and 27 for supplying an intake charge of fuel to the working chambers 65 and has exhaust port means 73 for discharging the exhaust gases from the engine. Ignition means, shown in the form of a spark plug 75 is provided to ignite the intake charge. As viewed in FIGS. 1 and 2 the rotor 5 moves in a clockwise direction so that each apex portion 9 moves successively past the intake port 11, the spark plug 75 and the exhaust port 73.

Lubricating oil is provided in the space surrounding eccentric 47 and adjacent gears 67 and 69. To prevent passage of the lubricating oil into the working chambers 65, suitable oil sealing means in the form of one or more oil sealing rings 77 may be provided in the rotor end faces 51 and 53. These sealing rings slide against the adjacent outer body end walls 25 and 27.

The engine so far described is similar to the engine disclosed in the aforementioned United States Patent No. 2,988,065, and reference is made to said patent for a more detailed description of the engine.

As set forth previously, each of the working chambers 65 is separated from the adjacent working chambers by an apex seal and vent means 7. All of the seal and vent means 7 are identical and a description of one will suffice for all. Each of the apex portions 9 is provided with a generally rectangular shaped groove or slot 91 (see FIGS. 2–4) which extends transversely between opposite end faces 51 and 53. Each slot 91 is cylindrically bored adjacent the end faces 51 and 53 for receiving cylindrically shaped seal pins 93 having slots 95 therein (FIG. 5) aligned with the respective slot 91 in the rotor. Shims 97 and springs 99 are provided for biasing the seal pins 93 outwardly against the end walls 25 and 27 of the outer body 31. Slidably mounted in a radial direction in each slot 91 and with a slight lateral clearance are two sealing members 101 and 103. Seal 101 may be referred to as the trailing seal and seal 103 may be referred to as the leading seal of each seal and vent means 7. The seals 101 and 103 are each formed of two pieces 105 and 107, and 109 and 111, respectively (see FIGS. 3, 6 and 7). The two pieces of each seal together give a generally rectangular shape to the respective seal. The piece 105 of seal 101 and the piece 109 of seal 103 are cut at an angle at opposite ends thereof and slidably support the pieces 107 and 111, respectively, which are generally triangular in shape. Each of the pieces of the seals 101 and 103 has a depending foot 112 adjacent the end faces of the rotor. A double leaf spring 113 comprising two individual springs 115 and 117 connected together at approximately their mid-points by a web 119 is fitted against the radially inward surface of the slot 91. The ends of the springs 115 and 117 engage the radially inward edge of the pieces of seals 101 and 103 adjacent the respective foot portions 112 for biasing the seals 101 and 103 into engagement with the inner peripheral surface 28 of the peripheral wall 29 and the end walls 25 and 27.

The leading and trailing apex seals 101 and 103 are in face-to-face relationship and have mating recesses or cut-out portions 129 in the outer edge portions of their interfaces, thereby providing openings 131 (see FIG. 4). The openings are separated by mating ribs 133 on each of the seal pieces 105 and 109. Cutout portions 129 in the pieces 105 and 109 open into enlarged recesses 135 and 137 of pieces 105 and 109, respectively. Hollow portions 135 and 137 are aligned and meet with one another to form a vent cavity. The ends of pieces 105 and 109, opposite their angled ends, are provided with radially extending recesses 139 and 141, respectively which are connected by an axially extending channel 143 to the respective enlarged recess portions 135 and 137. As will be made apparent hereinafter recess 141 permits unburned fuel which is forced past the corner of the trailing seal 101 formed by pieces 105 and 107 to be directed to the mating enlarged recesses 135 and 137 in the seals. Unburned fuel which is forced over the outer edge of trailing seal 101 tends to pass, in a manner hereinafter described, through openings 131 into the enlarged recessed portions 135 and 137.

Piece 109 of trailing seal 103 has two ports 145 extending from the recessed portions 137 to the outside of the seal. Ports 145 are aligned with ports 147 in the rotor 5, and the latter ports open into a pair of tubes 149 extending in a generally radial direction through rotor 5 to an internal support of a bearing 151 journaled on eccentric 47. As shown in FIG. 8, tubes 149 are closed at their inner ends by plugs 153 secured in the tubes by a pin 155, which also extends through a web 157 in rotor 5 and prevents the tubes 149 from turning.

The tubes 149 have axial aligned holes 159 which are located within an axially extending transfer tube 161 extending from end face 51 to end face 53. As shown, transfer tube 161 has plugs 163 in its opposite ends. The plugs 163 have a relatively small passage 165 therein extending from the interior of transfer tube 161 to the end faces 51 and 53.

The end faces 51 and 53 are recessed as indicated at 167 between the end seal 63 and the oil seals 77. Each recess extends completely around each end face 51 and 53 and is bounded by axially extending edges 169 and 171 (see FIGS. 2 and 8). The depth of recess 167 increases as the width of the recess 167 decreases as shown in FIGS. 2 and 8. Passages 165 open into the recess 167 so that unburned fuel passing through the openings 131 in seals 101 and 103 passes from such openings through the cavity formed by mating enlarged recesses 135 and 137, ports 145 and 147, tubes 149, holes 159, transfer tube 161, and passages 165 into the recessed portion 167.

Means is provided for placing the recesses 167 in constant communication with intake ports 11. This means is in the form of a channel 181 formed in each of the end walls 25 and 27 which extends away from the intake ports 71 in a direction opposite to the direction of rotation of the rotor 5. A bridge 183 (see FIG. 9) is formed across each channel at the juncture of the latter with the respective intake port 11 to prevent the respective seal 63 from dropping into the channel 181 and being caught or snagged on the edge of the channel. Each channel 181 includes a tunnel 185 extending under bridge 183 and placing the channel in communication with the respective intake port. It will be seen that as the rotor moves in a clockwise path as viewed in FIG. 2 with the apex seal and vent means 7 in constant contact with the inner surface 28 of the peripheral wall 29 the intake ports per se are in communication with the adjacent recess 167 a substantial portion of the time. However, at certain times during the movement of the rotor, such as when the rotor is in the position shown in FIG. 2 when the fuel-air mixture in the chamber adjacent spark plug 75 is under very high pressure and leakage past apex seals 61 is greatest, the intake ports 11 per se are not in communication with the recesses 167 and would not provide a vent for the unburned fuel leaking past the apex seals. However, at this time the channels 181 are axially aligned with and in communication with recesses 167, thereby placing the latter in communication with the intake ports so that a portion of the unburned fuel forced past the apex seals adjacent the chamber during high pressures is vented to the intake ports. The provision of the channels 181 for placing the annular recesses 167 in constant communication with intake ports 11 is an advantageous feature whether or not it is employed with a rotor having vented apex seals. Any unburned fuel which is forced inwardly past seals 163 is immediately vented to the intake ports rather than being trapped between the rotor faces and the outer body end walls.

Reactor or after-burner 13 comprises a cylinder or outer body 193 having a generally elliptical cross section. It has one or more connector tubes or pipes 195 extending between body 193 and the exhaust port or ports 73. As shown herein, reactor 13 has two connector tubes 195 (FIG. 10) and is adapted to be connected to a body 3 having two cavities 31 located in side-by-side relationship. The pipes 195 have annular flanges 197 which are clamped to body 3 and an inner tube or liner 198 positioned concentrically within each pipe 195 with a flange position 198a of each tube sealing in a countersunk rim portion at the engine end of each pipe. Pipes 195 and tubes 198 are maintained in spaced relation to provide an insulating dead air space 199 therebetween.

Cylinder 193 is formed of generally elliptically shaped end walls 201 and 203 (FIG. 10) secured by welding, for example, to an elongated shell or side wall 205.

Separator plates 207 and 209 are spaced inwardly from walls 201 and 203, respectively, by L-shaped spacer tabs 211, and are of the same general shape only smaller, as the end walls 201 and 203. The edges of the generally elliptical portions of separator plates 207 and 209 are maintained approximately equidistant from the inside of shell 205 by fingers 213 extending from the plates to the shell. Plate 209 has an opening 215 therein and plate 207 has a hole 216 therein for purposes to be made apparent hereinafter.

An open-ended internal separator shell 217 is located within outer shell 205 and spaced therefrom by L-shaped spacer tabs 219. The length of shell 217 is less than the distance between separator plates 207 and 209 so the end edges of the shell 217 are located inwardly in an axial direction from the separator plate. Further, the distance between opposite sides of shell 217 are greater than the distance between opposite edges of each separator plate 207 and 209 as will be seen in FIGS. 10 and 12.

An enclosed can or cylinder 221 is mounted inside shell 217 and separator plates 207 and 209. Can 221 is also of elliptical shape in cross section. It includes a shell or side wall 223 spaced and separated from shell 217 by spacer tabs 225 connected to the inside of shell 217. End plates 227 and 229 are connected by welding, for example, to shell 223 and are maintained in spaced relationship to separator plates 207 and 209 by spacer tabs 231 secured to plates 207 and 209. End plate 229 has a portion thereof cut out as indicated at 233 so that the interior of the can 221 is in communication with the space between end plate 229 and separator plate 209.

A first or reactor chamber 235 is formed with can 221 by an elongated semi-circular baffle plate 237 extending from end plate 229 to a point near, but spaced from end plate 227, and a chamber end plate 239 having a semi-circular notch mating with baffle plate 237 and spaced from end plate 229 by a distance sufficient to insure that all of the connector tubes 198 open into chamber 235 between end plates 229 and 239. In this regard it will be understood that the connector tubes 198 pass through openings in shells 205, 217 and 223 into the chamber 235. End plate 239 has an edge contour similar to end plate 229 in the region where the cutout 233 is formed, and a cover 241 extends axially between end plates 229 and 239 from one inside surface of can 221 to the opposite inside surface of the can. An arcuate portion of baffle plate 237 is removed adjacent end plate 229 to provide an outlet or opening 243 placing the interior of chamber 235 in communication with can 221. Opening 243 is located so as to encourage the gases to rotate in can 221.

End wall 201 of the outside cylinder 193 has an opening 245 therein which communicates with an exhaust pipe 247 secured to end wall 201 by a fitting 249. It will be seen that the construction of reactor 13 creates a tortuous path for the unburned fuel emitted from exhaust ports 73. The purpose of this path is to facilitate combustion in chamber 235, and to a lesser extent the can 221, of the unburned fuel emitted from the exhaust ports as explained hereinafter.

Operation of the apparatus of this invention is as follows:

Assuming the rotor 5 is in the position shown in FIG. 2, a fuel-air mixture is admitted into the cavity 31 through the port 11. The fuel-air mixture in the chamber adjacent ports 11 is then compressed as the rotor moves in a clockwise direction until the peripheral portion of the rotor which was originally adjacent the intake port 11, such position being indicated by the reference character A in FIG. 2, is adjacent the spark plug 75 in the position indicated by reference character B. In this position the fuel-air mixture is in maximum compression and the pressure adjacent the apex seal and vent means 7 forces the seals 101 and 103 of the leading apex portion to be forced as a unit against the leading side of the respective slot 91 (see FIG. 3). For the same reason the seals 101 and 103 of the trailing apex portion are forced as a unit against the trailing side of the respective slot 91. With regard to the leading apex portion, movement of seal 101 away from the wall of the slot 91 adjacent the fuel-air mixture, which is in a high pressured condition, causes a portion of the high pressure fuel-air mixture to pass between the seal 101 and the adjacent side of slot 91 to the area around spring 113 between the inner edges of the seals and the bottom of the slot. Thus high pressure fuel-air mixture assists the spring 113 in forcing the seals toward the inner surface of the peripheral wall. However, the pressure adjacent the outer end of the trailing seal 101 of the leading apex portion may be high enough to cause the seal 101 to move slightly away from the inner surface 28 of peripheral wall 29. If such movement of the trailing seal 101 occurs, unburned fuel-air mixture particles will leak past the seal.

Since the intake ports 11 are in communication with the openings 131 between the seals, and since the pressure in the intake ports is considerably less than the pressure of the fuel-air mixture adjacent the leading apex portion 7 when the rotor is in position B, a portion of the fuel-air mixture which reaches openings 131 in the leading apex portion is delivered, due to pressure differencs, through the cavity formed by mating enlarged recesses 135 and 137, ports 145 and 147, tubes 149, holes 159, transfer tube 161, passages 165, recess portions 167 adjacent side walls 25 and 27 and around the latter until the fuel-air mixture reaches channels 181. The fuel-air mixture then passes through the channels 181 to the intake ports 11 from which it is delivered back to the working chamber for the next working cycle. A substantial reduction in the amount of unburned fuel-air mixture leaking past the leading apex portion into the exhaust system is accomplished since the pressure differences between the intake ports 11 and the ignition chamber are sufficient to cause a substantial portion of the unburned fuel-air mixture to be delivered through the vent passages.

The pressure of the fuel-air mixture adjacent the trailing apex portion 7 when the rotor is in position B is also relatively high and, as mentioned previously, the seals 101 and 103 are forced as a unit against the trailing side of the respective slot 91. This provides a space between the seal 103 and the adjacent side of the slot and some fuel-air mixture passes through this space to the ports 147. This leakage is then returned to the intake ports 11 in the same manner as previously described. Obviously, it is desirable to minimize the amount of this leakage. This may be accomplished by proper selection of the maximum clearance between the seal 103 and the adjacent side of the slot and by the proper selection of the size of ports 147 so that a back pressure is created adjacent ports 147 which limits the maximum amount of fuel which can escape. While it is advantageous to prevent leakage of fuel past the trailing vent and seal means 7 so that loss of some power is prevented, leakage past the leading seal 103 or the trailing seal 101 of the trailing apex portion 7 when the rotor is in position B is not critical as far as emission is concerned since any leakage past the trailing apex portion 7, is not lost, but may be used again during the next ignition cycle.

Even though the several vent and seal means 7 are effective in reducing the unburned fuel emissions from the cavity or cavities 31, some unburned fuel and air mixture is delivered through the rotor and exhausted through exhaust ports 73. Additional unburned fuel is swept out of the exhaust port as a result of incomplete combustion in the combustion chamber. Since at least one working chamber is always exhausting to ports 73, a substantially continuous supply of hot exhaust products is delivered through the exhaust ports so that the exhaust ports and adjacent structure are maintained at a relatively high temperature during operation of the engine. The reactor facilities combustion of the unburned fuel and air mixture escaping from cavities 31 through exhaust ports 73.

The unburned fuel and air mixture passes from ports 73 through connector tubes 198 into the chamber 235 formed by shell 223, end plates 229 and 239, baffle plate 237 and cover 241. It will be understood that the temperature of the unburned fuel and air mixture is very high since it has just been discharged from the engine where combustion of most of the fuel and air mixture has taken place. If the fuel and air mixture discharged from exhaust ports 73 is in a large enough space and prevented from cooling too rapidly, it will continue to burn even after it is discharged from the outer body 3 of the engine, thus reducing the amount of unburned fuel which will be emitted into the atmosphere. The chamber 235 provides ample space for continued combustion of the fuel, and as made apparent hereinafter, the path of the materials of combustion after leaving chamber 235 creates an insulation blanket around the chamber and maintains the high temperatures necessary for continued combustion in the chamber. Thus, the unburned fuel entering chamber 235 continues to burn.

The products of combustion in chamber 235 pass therefrom through opening 243 in baffle plate 237 into the interior of can 221. The shapes of chamber 235 and can 221 cause the products to swirl as they pass therethrough. The products, hereinafter referred to as exhaust products, flow lengthwise of can 221 from the right-hand end thereof to the left-hand end thereof, as viewed in FIG. 10, between shell 223 and baffle plate 237. After reaching the left-hand end of can 221 the exhaust products pass around the end of baffle plate 237 and return toward the right-hand end of the can 221, passing, in route, over the cover 241 of chamber 235. The exhaust products are discharged from the right-hand end of can 221 through the cut-out 233 in end plate 229. A portion of the exhaust products impinge on separator plate 209 around opening 215 and are deflected toward the sides of said plate between the latter and end plate 229 of can 221. Another portion of the exahust products passing through cut-out 233 pass through opening 215 in separator plate 209 and impinge on end wall 203 which deflects the exhaust products toward the sides of separator plate 209 between the latter and end wall 203.

When the exhaust products deflected by the separator plate 209 and end wall 203 reach the edges of can 221 and separator plate 209, respectively, they combine and flow length-wise along the reactor from left to right as viewed in FIG. 10, between shells 223 and 217, and between shells 217 and 205. Upon reaching the left-hand end of the reactor 13, the exhaust products pass between end plate 227 and separator plate 207, and between separator plate 207 and end wall 201 to hole 216 and opening 245, respectively. The exhaust products are then discharged through exhaust pipe 247.

It will be seen that the several layers of exhaust products surrounding chamber 235, i.e., the layer of exhaust products within can 221, the layer of exhaust products between can 221, shell 217 and separator plates 207 and 209, and the layer of exhaust products between shell 217, separator plates 207 and 209, and reactor cylinder shell 205 and end walls 201 and 203, are in effect multiple layers of insulation which reduce heat transfer from the chamber 235 to the atmosphere. Thus, the high temperatures necessary for continued combustion of unburned fuel discharged from exhaust ports 73 are maintained within chamber 235. Shell 217 acts as a radiation shield between inner can wall 223 and outer can wall 205; separator plates 207 and 209 similarly act as radiation shields between can ends 229 and 203, and 201 and 227, respectively.

On recent tests of a rotary combustion engine constructed in accordance with this invention and a rotary combustion engine which did not have the combination of the vented apex seals and reactor of this invention, it was found that the engine constructed in accordance with this invention, under certain test conditions, produced a hydrocarbon emission which was approximately eighty percent less, in parts, per million, than the hydrocarbon emission of a rotary combustion engine which did not have the combination of this invention.

It will be understood that the areas between the side faces 51 and 53 of the rotor 5 outwardly of the seals 63 and the adjacent end walls 25 and 27 of the outer body are relatively thin and flat. Any unburned fuel which enters such areas usually remains in any unburned state after ignition of the main portion of the fuel by spark plug 75. The fuel in the thin flat areas, which are often referred to as quench areas, remains in an unburned state because the areas are too small to support complete combustion and flame. It will be noted that the quench areas of this invention are relatively small because the seals 63 are located close to the periphery of the rotor 5. The amount of unburned fuel which can collect in the quench areas is thus also relatively small. In addition to reducing the hydrocarbon emission, it will be noted that the unburned hydrocarbons which are returned to the intake ports 11 obviously may be utilized during the subsequent combustion cycle, thus increasing the fuel economy of the engine.

Instead of venting directly into the intake ports 11 apparatus is also provided for venting the unburned fuel-air mixture into the oil sump surrounding eccentric 47. As shown in FIG. 8, the tubes 149 may be provided with holes 187 which place the interior of the tubes in connection with the oil sump. Conventional equipment may be utilized for returning the unburned fuel admitted to the sump to the carburetion apparatus or the intake ports. However, as shown in FIG. 8 the holes 187 in tubes 149 are plugged by pins 189 held in the holes by screw members 191 threaded through the end faces 51 and 53 of rotor 5. This prevents delivery of the unburned fuel-air mixture to the sump, thereby insuring that all of the unburned fuel-air mixture is delivered directly to the intake ports through the previously described vent passages. It will be understood that if the holes 187 are unplugged so that the unburned fuel-air mixture is delivered to the sump, the passages 165 in plugs 163 may be closed to facilitate venting to the sump.

It will be seen that the apparatus of this invention reduces the unburned fuel-air mixture emission, thereby increasing the acceptability of this type of rotary combustion engine.

In view of the foregoing it will be seen that the several objects and other advantages of this invention are attained.

It will be understood that the invention is not to be limited to the exact constructions shown and described, but that various changes and modifications may be made without departing from the spirit and scope of the invention, as defined in the appended claims.

We claim:
1. A rotary combustion engine comprising an outer body having axially spaced end walls and a peripheral wall interconnecting the end walls to form a cavity therebetween having a longitudinal axis, the inner surface of said peripheral wall having a multi-lobed profile, said outer body having an intake port for admitting fuel to said cavity and an exhaust port for discharging unburned fuel and exhaust products from such cavity, an inner body in said cavity and rotatable relative to said outer body about an axis spaced from but parallel to said longitudinal axis, said inner body having a plurality of circumferentially spaced apex portions around its periphery, each apex portion having sealing means engaging the inner surface of said peripheral wall and extending between opposite side faces of said inner body, one of said side faces of said inner body having an annular recess therein, means forming a passage extending through said inner body from each of said sealing means to said annular recess to permit some of the fuel tending to be forced past each of said sealing means to be vented from the sealing means to said annular recess, means forming a passage in said outer body for placing said annular recess in communication with fuel entering said cavity through said intake port for venting unburned fuel in said annular recess, and reactor means connected to said exhaust port for facilitating combustion therein of unburned fuel escaping past said apex sealing means and discharged from said exhaust port.

2. A rotary combustion engine as set forth in claim 1 wherein each apex portion has a slot therein extending between said opposite side faces of said inner body each of said sealing means including two seals in the respective slot, said seals being face-to-face with one another, at least one of said seals having a recess in its interface to provide a vent opening between said seals, and at least one port in one of said seals placing said vent opening in communication with said passage means in said inner body, said reactor means comprising means forming a chamber connected to said exhaust port in which combustion of unburned fuel admitted thereto may occur, said means forming a chamber having an outlet, and means surrounding said chamber forming means causing the products of combustion of fuel in said cavity and chamber, upon discharge thereof through said outlet, to be directed in a path around said chamber forming means for insulating the letter.

3. A rotary combustion engine as set forth in claim 2 wherein each of said means forming a passage through said inner body provides at least one passage extending inwardly from a point adjacent the seal having a port therein, and a second passage extending from said first passage to said annular recess, said means surrounding said chamber forming means including a cylinder close at one end and having an exhaust opening at the other end, and means spacing the walls of said cylinder from said chamber forming means.

4. A rotary combustion engine as set forth in claim 3 wherein said intake port opens into the end wall adjacent said annular recess, said annular recess being axially aligned with said intake port during a portion of the relative rotation between said bodies, said means forming a passage in said outer body for placing said annular recess in communication with fuel entering said cavity through said intake port comprising a channel in the end wall adjacent said annular recess, one portion of said channel being axially aligned with said annular recess during the remaining portion of the relative rotation between said bodies, one end of said channel being in communication with said intake port, whereby said intake port is in communication with said annular recess at all times during the relative rotation between said bodies, said means spacing the walls of said cylinder from said chamber forming means including a can surrounding said chamber and inside said cylinder, a portion of one end of said can forming an end wall of said chamber, said one end of said can having an opening placing the interior of said can in communication wtih the interior of said cylinder, said outlet in said chamber forming means opening into said can.

5. A rotary combustion engine as set forth in claim 4 wherein said inner body has an annular seal in its end face located outwardly of said annular recess, said channel having a bridge member thereover to inhibit interference the annular seal and the edge of said channel, said means spacing the walls of said cylinder from said chamber forming means further including separator plates between the ends of said can and the ends of said cylinder, a separator shell between the side wall of said can and the side wall of said cylinder, and spacers between said side walls and between said separator plates and the ends of said can and cylinder.

6. A rotary combustion engine comprising an outer body having axially spaced end walls and a peripheral wall interconnecting the end walls to form a cavity therebetween having a longitudinal axis, the inner surface of said peripheral wall having a multi-lobed profile, said outer body having an intake means for admitting fuel to said cavity, and an exhaust port for discharging any unburned fuel and exhaust products from said cavity, an inner body in said cavity and rotatable relative to said outer body about an axis spaced from but parallel to said longitudinal axis, said inner body having a plurality of circumferentially spaced apex portions around its periphery, each apex portion having sealing means engaging the inner surface of said peripheral wall, means forming a vent passage from each sealing means through the interior of said inner body into communication with said intake means, and after-burner means connected to said exhaust port for facilitating combustion therein of unburned fuel escaping past said apex sealing means and discharged from said exhaust port.

7. A rotary combustion engine as set forth in claim 6 wherein said means forming a vent passage through the interior of said inner body provides a first passage extending inwardly from a point adjacent each sealing means, and a second passage extending laterally from said first passage to one of the side faces of said inner body, said after-burner means comprising means forming a chamber connected to said exhaust port in which combustion of unburned fuel admitted thereto may occur, said means forming a chamber having an outlet, and means surrounding said chamber forming means causing the products of combustion of fuel in said cavity and chamber, upon discharge thereof through said outlet, to be directed in a path around said chamber forming means for insulating the latter.

8. A rotary combustion engine as set forth in claim 6 wherein each apex portion has a slot therein extending between said opposite side faces of said inner body, each of said sealing means including two seals located in the respective slot in face-to-face relationship, each seal being formed of an elongated member one end of which is angled relative to its inner and outer edges and a generally triangularly-shaped member one edge of which engages the angled end of the respective elongated member, the triangularly-shaped members of each seal being in face-to-face relationship with elongated members of the adjacent seal, said after-burner means comprising means forming a chamber connected to said exhaust port in which combustion of unburned fuel admitted thereto may occur, said means forming a chamber having an outlet, and means surrounding said chamber forming means causing the products of combustion of fuel in said cavity and chamber, upon discharge thereof through said outlet, to be directed in a path around said chamber forming means for insulating the latter.

9. A rotary combustion engine as set forth in claim 8 wherein said members of each of said seals have mating recesses in their interfaces extending inwardly from their outer edges, said recesses forming an elongated cavity between said seals of each sealing means, and at least one port in one of said members placing said elongated cavity in communication with said passage means in said inner body, said means surrounding said chamber forming means including a cylinder closed at one end and having an exhaust opening at the other end, and means spacing the walls of said cylinder from said chamber forming means.

10. A rotary combustion engine as set forth in claim 9 wherein said means spacing the walls of said cylinder from said chamber forming means including a can surrounding said chamber and inside said cylinder, a portion of one end of said can forming an end wall of said chamber, said one end of said can having an opening placing the interior of said can in commuication with the interior of said cylinder, said outlet in said chamber forming means opening into said can.

References Cited
UNITED STATES PATENTS 2,979,042   4/1961   Bentele _____ 123—8
3,142,440   7/1964   Schagg _____ 230—145

RALPH D. BLAKESLEE, *Primary Examiner.*